US008014455B2

(12) United States Patent
Kim et al.

(10) Patent No.: US 8,014,455 B2
(45) Date of Patent: Sep. 6, 2011

(54) FEEDBACK OF DIFFERENTIALLY ENCODED CHANNEL STATE INFORMATION FOR MULTIPLE-INPUT MULTIPLE-OUTPUT (MIMO) AND SUBBAND SCHEDULING IN A WIRELESS COMMUNICATION SYSTEM

(75) Inventors: Byoung-Hoon Kim, San Diego, CA (US); Durga Prasad Malladi, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 759 days.

(21) Appl. No.: 11/686,952

(22) Filed: Mar. 15, 2007

(65) Prior Publication Data

US 2007/0242770 A1 Oct. 18, 2007

Related U.S. Application Data

(60) Provisional application No. 60/786,445, filed on Mar. 27, 2006.

(51) Int. Cl.
*H04K 1/10* (2006.01)
(52) U.S. Cl. .................................................. 375/260
(58) Field of Classification Search .................. 375/260
See application file for complete search history.

(56) References Cited

U.S. PATENT DOCUMENTS

| 7,321,563 | B2 | 1/2008 | Kim et al. | |
|---|---|---|---|---|
| 7,450,532 | B2 * | 11/2008 | Chae et al. | 370/310 |
| 2003/0128658 | A1 * | 7/2003 | Walton et al. | 370/208 |
| 2004/0001429 | A1 * | 1/2004 | Ma et al. | 370/210 |
| 2004/0120411 | A1 * | 6/2004 | Walton et al. | 375/260 |
| 2005/0031044 | A1 * | 2/2005 | Gesbert et al. | 375/259 |
| 2005/0170782 | A1 * | 8/2005 | Rong et al. | 455/67.11 |

(Continued)

FOREIGN PATENT DOCUMENTS

EP 0752779 1/1997

(Continued)

OTHER PUBLICATIONS

Rey, "Robust power allocation algorithms for MIMO OFDM systems with imperfect CSI", IEEE Transactions on [see also Acoustics, Speech, and Signal Processing, IEEE Transactions on] Signal Processing, vol. 53, Issue 3, Mar. 2005 pp. 1070-1085.*

(Continued)

*Primary Examiner* — Juan A Torres
(74) *Attorney, Agent, or Firm* — Peng Zhu; Kenyon S. Jenckes

(57) ABSTRACT

Techniques for efficiently sending channel state information using differential encoding are described. Differential encoding may be performed across space, across frequency; across space and frequency, across space, frequency and time, or across some other combination of dimensions. In one design, spatial state information may be determined for multiple spatial channels on multiple subbands. The spatial channels may correspond to different antennas, different precoding vectors, etc. Channel quality indicator (CQI) values may be obtained for the multiple spatial channels on the multiple subbands. The CQI values may be differentially encoded across the multiple spatial channels and the multiple subbands to obtain differential CQI information. In another design, CQI values may be obtained for multiple spatial channels on the multiple subbands in multiple time intervals and may be differentially encoded across space, frequency and time. The differential CQI information and the spatial state information may be sent as feedback.

28 Claims, 10 Drawing Sheets

U.S. PATENT DOCUMENTS

| | | | |
|---|---|---|---|
| 2005/0287978 A1* | 12/2005 | Maltsev et al. | 455/403 |
| 2006/0029157 A1* | 2/2006 | Dabak et al. | 375/299 |
| 2006/0071807 A1* | 4/2006 | Sadowsky | 340/825.72 |
| 2006/0209980 A1* | 9/2006 | Kim et al. | 375/267 |
| 2006/0268623 A1* | 11/2006 | Chae et al. | 365/189.01 |
| 2007/0258366 A1* | 11/2007 | Imamura | 370/230 |
| 2007/0298728 A1* | 12/2007 | Imamura et al. | 455/77 |
| 2008/0069031 A1* | 3/2008 | Zhang et al. | 370/328 |
| 2008/0108310 A1* | 5/2008 | Tong et al. | 455/69 |
| 2009/0219838 A1* | 9/2009 | Jia et al. | 370/278 |

FOREIGN PATENT DOCUMENTS

| | | |
|---|---|---|
| EP | 1786129 | 5/2007 |
| WO | 2005125044 | 12/2005 |
| WO | WO2005125020 A1 | 12/2005 |
| WO | 2006028204 | 3/2006 |

OTHER PUBLICATIONS

Lee, "On closed-loop transmit beamforming with simple beam-control commands", 15th IEEE International Symposium on Personal, Indoor and Mobile Radio Communications, 2004, PIMRC 2004, vol. 2, Sep. 5-8, 2004 pp. 1278-1282 vol. 2.*

International Search Report—PCT/US07/064962, International Search Authority—European Patent Office—Sep. 5, 2007.

Written Opinion—PCT/US07/064962, International Search Authority—European Patent Office—Sep. 5, 2007.

International Preliminary Report on Patentability—PCT/US07/064962, International Search Authority—The International Brueau of WIPO—Sep. 30, 2008.

AMC and HARQ Using Frequency Domain Channel-dependent Scheduling in MIMO Channel Transmission, NTT DoCoMo, NEC, SHARP, 3GPP TSG RAN WG1 #42 on LTE, London, UK, Aug. 29-Sep. 2, 2005, R1-050942.

* cited by examiner

Space      $X_{nm}$ = CQI value for spatial channel $m$ on subband $n$

|   | 1 | 2 | 3 | ... | n | ... | N |
|---|---|---|---|---|---|---|---|
| a | $X_{1a}$ | $X_{2a}$ | $X_{3a}$ | ... | $X_{na}$ | ... | $X_{Na}$ |
| b | $X_{1b}$ | $X_{2b}$ | $X_{3b}$ | ... | $X_{nb}$ | ... | $X_{Nb}$ |
| ... | ... | ... | ... | ... | ... | ... | ... |
| M | $X_{1M}$ | $X_{2M}$ | $X_{3M}$ | ... | $X_{nM}$ | ... | $X_{NM}$ |

Subband / Freq

Spatial Channel

Differential CQI Encoding Across Space

Measure → Differentially Encode → Send $X, Y$

Transmitter Compute
$X = X_a$
$Y = X_b - X_a$

Receiver Compute
$X_a = X$
$X_b = X + Y$

FIG. 4A Differential CQI Encoding Across Space per Subband

| Spatial Channel | | | | | | | | |
|---|---|---|---|---|---|---|---|---|
| a | $X_1$ | $X_2$ | ... | $X_{n-1}$ | $X_n$ | $X_{n+1}$ | ... | $X_N$ |
| b | $Y_1$ | $Y_2$ | ... | $Y_{n-1}$ | $Y_n$ | $Y_{n+1}$ | ... | $Y_N$ |
| Subband | 1 | 2 | ... | n-1 | n | n+1 | ... | N |

FIG. 4B Differential CQI Encoding Across Space and Frequency (Designated Subband at $\ell$)

| Spatial Channel | | | | | | | | |
|---|---|---|---|---|---|---|---|---|
| a | $\Delta X_1$ | $\Delta X_2$ | ... | $\Delta X_{\ell-1}$ | $X_\ell$ | $\Delta X_{\ell+1}$ | ... | $\Delta X_N$ |
| b | $\Delta Y_1$ | $\Delta Y_2$ | ... | $\Delta Y_{\ell-1}$ | $Y_\ell$ | $\Delta Y_{\ell+1}$ | ... | $\Delta Y_N$ |
| Subband | 1 | 2 | ... | $\ell-1$ | $\ell$ | $\ell+1$ | ... | N |

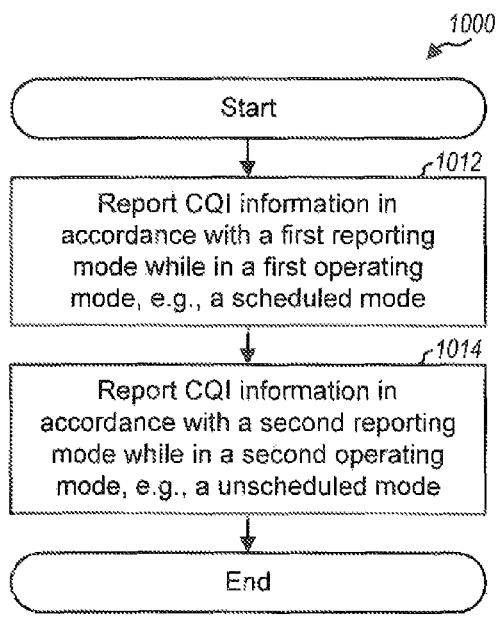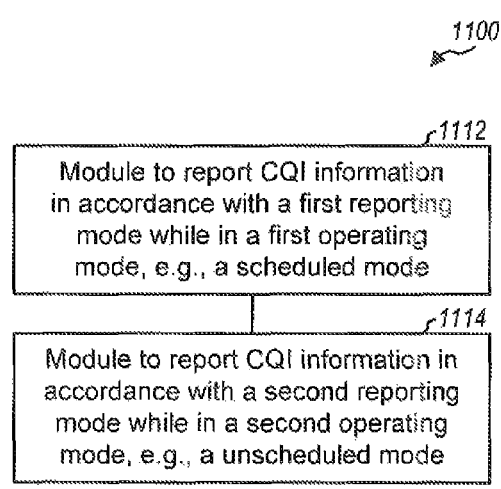
FIG. 10
FIG. 11

FEEDBACK OF DIFFERENTIALLY ENCODED CHANNEL STATE INFORMATION FOR MULTIPLE-INPUT MULTIPLE-OUTPUT (MIMO) AND SUBBAND SCHEDULING IN A WIRELESS COMMUNICATION SYSTEM

The present application claims priority to provisional U.S. Application Ser. No. 60/786,445, entitled "A CHANNEL STATE FEEDBACK FOR DOWNLINK MIMO-OFDMA SUB-BAND SCHEDULING," filed Mar. 27, 2006, assigned to the assignee hereof and incorporated herein by reference.

BACKGROUND

I. Field

The present disclosure relates generally to communication, and more specifically to techniques for sending channel state information.

II. Background

In a wireless communication system, a base station may utilize multiple (T) transmit antennas for data transmission to a terminal equipped with multiple (R) receive antennas. The multiple transmit and receive antennas form a multiple-input multiple-output (MIMO) channel that may be used to increase throughput and/or improve reliability. For example, the base station may transmit up to T data streams simultaneously from the T transmit antennas to improve throughput. Alternatively, the base station may transmit a single data stream from all T transmit antennas to improve reception by the terminal.

Good performance may be achieved by transmitting one or more data streams via the MIMO channel in a manner such that the highest overall throughput can be achieved for the data transmission. To facilitate this, the terminal may estimate the MIMO channel response and send channel state information to the base station. The channel state information may indicate how many data streams to transmit, how to transmit the data streams, and a channel quality indicator (CQI) for each data stream. The CQI for each data stream may indicate a received signal-to-noise ratio (SNR) for that data stream and may be used to select an appropriate rate for the data stream. The channel state information may improve performance of data transmission to the terminal. However, the terminal may consume a large amount of radio resources to send the channel state information to the base station.

There is therefore a need in the art for techniques to efficiently send channel state information in a wireless communication system.

SUMMARY

Techniques for efficiently sending channel state information in a wireless communication system are described herein. In an aspect, differential encoding may be used to reduce the amount of channel state information to send. Differential encoding refers to conveying differences between values instead of actual values. The differential encoding may be performed on CQI values across space, across frequency, across space and frequency, across space, frequency and time, or across some other combination of dimensions.

In one design, spatial state information may be determined for multiple spatial channels on multiple subbands. The spatial channels may correspond to different antennas, different precoding vectors, etc. The spatial state information may indicate a specific set of antennas, a specific set of precoding vectors, etc., to use for data transmission. CQI values may be obtained for the multiple spatial channels on the multiple subbands. The CQI values may be differentially encoded across the multiple spatial channels and the multiple subbands to obtain differential CQI information, which may comprise various differential CQI values. In another design, CQI values may be obtained for multiple spatial channels on multiple subbands in multiple time intervals and may be differentially encoded across space, frequency and time. In any case, the differential CQI information and the spatial state information may be sent as feedback.

In another aspect, different channel state information may be sent in different operating modes with heterogeneous reporting). In one design, CQI information may be reported in accordance with a first reporting mode while in a first operating model e.g., a scheduled mode. CQI information may be reported in accordance with a second reporting mode while in a second operating mode, e.g., an unscheduled mode. The CQI information may be generated in different manners and/or sent at different rates for different reporting modes.

Various aspects and features of the disclosure are described in further detail below.

BRIEF DESCRIPTION OF THE DRAWINGS

FIG. 4A shows differential CQI encoding across space per subband.

FIG. 4B shows differential CQI encoding across space and frequency.

FIGS. 10 and 11 show a process and an apparatus, respectively, for heterogeneous reporting of channel state information.

DETAILED DESCRIPTION

The techniques described herein for sending channel state information may be used for various communication systems that support MIMO transmission and utilize any form of Frequency Division Multiplexing (FDM). For example, the techniques may be used for systems that utilize Orthogonal FDM (OFDM), Single-Carrier FDM (SC-FDM), etc. OFDM and SC-FDM and SC-FDM partition the system bandwidth into multiple (K) orthogonal subcarriers, which are also referred to as tones, bins etc. Each subcarrier may be modulated with data. In general, modulation symbols are sent in the frequency domain with OFDM and in the time domain with SC-FDM.

The techniques may also be used to send channel state information on the downlink or uplink. The downlink (or forward link) refers to the communication link from a base station to a terminal, and the uplink (or reverse link) refers to the communication link from the terminal to the base station. For clarity, the techniques are described below for sending channel state information on the uplink.

Figure 1:
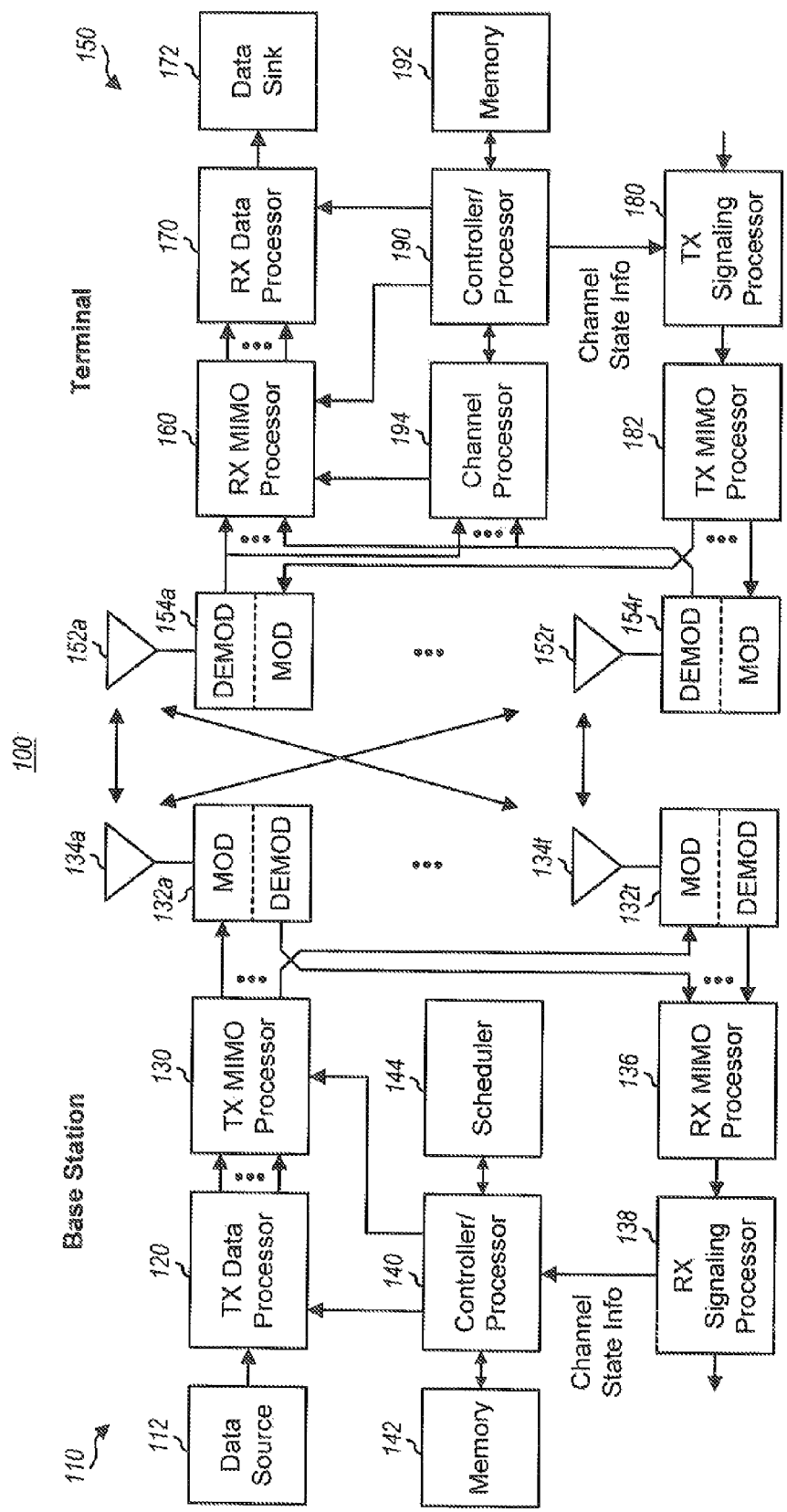
FIG. 1 shows a block diagram of a base station and a terminal.

FIG. 1 shows a block diagram of a design of a base station 110 and a terminal 150 in a wireless communication system 100. Base station 110 may also be referred to as a Node B, an evolved Node B (eNode B), an access point, etc. Terminal 150 may also be referred to as a user equipment (UE), a mobile station, an access terminal, a subscriber unit, a station, etc. Terminal 150 may be a cellular phone, a personal digital assistant (PDA), a wireless communication device a handheld device a wireless modem, a laptop computer, etc. Base station 110 is equipped with multiple (T) antennas 134a through 134t. Terminal 150 is equipped with multiple (R) antennas 152a through 152r. Each transmit antenna and each receive antenna may be a physical antenna or an antenna array.

At base station 110, a transmit (TX) data processor 120 may receive traffic data from a data source 112, process (e.g., format, encode, interleave, and symbol map) the traffic data in accordance with a packet format, and generate data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both thee base station and terminal. A packet format may indicate a data rate, a coding scheme or code rate, a modulation scheme, a packet size, and/or other parameters. A packet format may also be referred to as a modulation and coding scheme, a rate, etc, TX data processor 120 may demultiplex the data symbols into M streams, where in general $1 \leq M \leq T$. The M data symbol streams may be sent simultaneously via a MIMO channel and may also be referred to as data streams, spatial streams, traffic streams, etc.

A TX MIMO processor 130 may perform transmitter spatial processing on the data and pilot symbols based on direct MIMO mapping, precoding, etc. A data symbol may be sent from one antenna for direct MIMO mapping or from multiple antennas for precoding. Processor 130 may provide T streams of output symbols to T modulators (MOD) 132a through 132t. Each modulator 132 may perform modulation (e.g., for OFDM, SC-FDM, etc.) on the output symbols to obtain output chips. Each modulator 132 further processes (e.g., converts to analog, filters, amplifies, and upconverts) its output chips and generates a downlink signal. T downlink signals from modulators 132a through 132t are transmitted via antennas 134a through 134t, respectively.

At terminal 150, R antennas 152a through 152r receive the T downlink signals, and each antenna 152 provides a received signal to a respective demodulator (DEMOD) 154. Each demodulator 154 processes (e.g., filters, amplifies, downconverts, and digitizes) its received signal to obtain samples and may further perform demodulation (e.g., for OFDM, SC-FDM, etc.) on the samples to obtain received symbols. Each demodulator 154 may provide received data symbols to a receive (RX) MIMO processor 160 and provide received pilot symbols to a channel processor 194. Channel processor 194 may estimate the response of the MIMO channel from base station 110 to terminal 150 based on the received pilot symbols and provide channel estimates to RX MIMO processor 160. RX MIMO processor 160 may perform MIMO detection on the received data symbols with the channel estimates and provide data symbol estimates. An RX data processor 170 may process (e.g., deinterleave and decode) the data symbol estimates and provide decoded data to a data sink 172.

Terminal 150 may evaluate the channel conditions and send channel state information to base station 110. The channel state information may be processed (e.g., encoded, interleaved, and symbol mapped) by a TX signaling processor 180, spatially processed by a TX MIMO processor 182, and further processed by modulators 154a through 154r to generate R uplink signals, which are transmitted via antennas 152a through 152r.

At base station 110, the R uplink signals are received by antennas 134a through 134t, processed by demodulators 132a through 132t, spatially processed by an RX MIMO processor 136, and further processed (e.g., deinterleaved and decoded) by an RX signaling processor 138 to recover the channel state information sent by terminal 150. Controller/processor 140 may control data transmission to terminal 150 based on the channel state information received from the terminal.

Controllers/processors 140 and 190 control the operation at base station 110 and terminal 150, respectively. Memories 142 and 192 store data and program codes for base station 110 and terminal 150, respectively. A scheduler 144 may select terminal 150 and/or other terminals for data transmission on the downlink based on the channel state information received from all of the terminals.

S spatial channels may be available for downlink transmission from base station 110 to terminal 150, where $S \leq \min\{T, R\}$. The S spatial channels may be formed in various manners. For direct MIMO mapping, S data streams may be sent from S transmit antennas, one data stream per transmit antenna. The S spatial channels may then correspond to the S transmit antennas used for data transmission. For precoding, S data streams may be multiplied with a precoding matrix so that each data streams may be sent from all T transmit antennas. The S spatial channels may then correspond to S "virtual" antennas observed by the S data streams and formed with the precoding matrix. In general, M data streams may be sent on M spatial channels, one data stream per spatial channel, where $1 \leq M \leq S$. The M spatial channels may be selected from among the S available spatial channels based on one or more criteria such as overall throughput.

For simplicity, the following description assumes that each data stream is sent on one spatial channel, which may correspond to an actual antenna or a virtual antenna depending on whether direct MIMO mapping or precoding is used. The terms "data streams", "spatial channels", and "antennas" may be used interchangeably. M packets or codewords may be sent simultaneously on the M data streams.

Terminal 150 may recover the M data streams using various MIMO detection techniques such as linear minimum mean square error (MMSE), zero-forcing (ZF), successive interference cancellation (SIC), etc., all of which are known in the art. SIC entails recovering one data stream at a time, estimating the interference due to each recovered data stream, and canceling the interference prior to recovering the next data stream. SIC may improve the received SNRs of data streams that are recovered later.

System 100 may support subband scheduling to improve performance. The system bandwidth may be partitioned into multiple (N) subbands. Each subband may cover Q consecutive subcarriers among the K total subcarriers, where $Q=K/N$ or some other value. Terminal 150 may achieve different SNRs for different subbands due to frequency selective fading in a multipath channel. With subband scheduling, terminal 150 may be assigned subcarriers in a subband with good SNR instead of a subband with poor SNR. Data may be sent at a higher rate on the assigned carriers in the subband with good SNR.

Terminal 150 may send channel state information to support subband scheduling and MIMO transmission by base station 110. The channel state information may comprise:

Spatial state information used for MIMO transmission, and
CQI information used for subband scheduling, rate selection, etc.

The spatial state information may comprise various types of information. In one design, the spatial state information for a given subband may indicate a set of M transmit antennas to use for data transmission on that subband. Terminal 150 may estimate the MIMO channel response, evaluate different possible sets of transmit antennas based on the MIMO channel estimate, and determine the set of transmit antennas with the best performance (e.g., the highest overall throughput). The spatial state information may then indicate this set of transmit antennas.

In another design, the spatial state information for a given subband may indicate a set of M virtual antennas (or equivalently, a set of M precoding vectors) to use for transmission on that subband. Terminal 150 may evaluate data performance with different possible precoding matrices and/or different combinations of columns of the precoding matrices. The spatial state information may then indicate a set of M precoding vectors with the best performance, e.g., a specific precoding matrix as well as M specific columns of this precoding matrix.

In general, the spatial state information may indicate the number of data streams to transmit (which may be related to the rank of the MIMO channel), a set of antennas to use for transmission, a set of precoding vectors to use for transmission, other information, or any combination thereof. The spatial state information may be provided for one or more subbands.

The CQI information may convey SNRs or equivalent information for different spatial channels and/or different subbands. Different SNRs may be achieved for different subbands due to frequency selectivity of the wireless channel. Different SNRs may also be achieved for different spatial channels if base station 110 uses direct MIMO mapping for data transmission, if terminal 150 performs successive interference cancellation for data reception, etc. Different SNRs may thus be achieved for different spatial channels on different subbands. The SNR of a given spatial channel on a given subband may be used to select an appropriate packet format, which may indicate a code rate, a modulation scheme, a data rate, etc., to use for data sent via that spatial channel on that subband. In general, the CQI information may convey SNRs and/or other information indicative of received signal quality for one or more spatial channels and/or one or more subbands.

Figures 2, 3A:
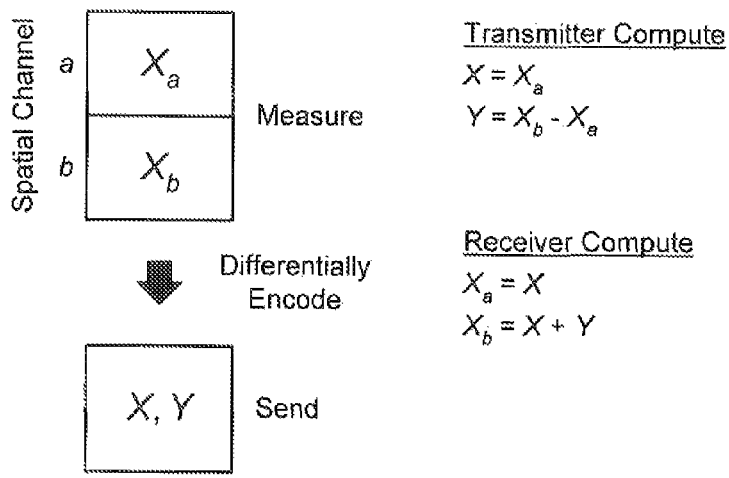
FIG. 2 shows CQI values for M spatial channels on N subbands.
FIG. 3A shows differential CQI encoding across space.

FIG. 2 shows CQI values for M spatial channels on N subbands. A CQI value $X_{nm}$ may be obtained for each spatial channel m on each subband n. The number of CQI values may then be proportional to the product of the number of spatial channels and the number of subbands, or M·N CQI values. These CQI values may be used for subband scheduling to select a suitable subband for data transmission. These CQI values may also be used to determine an appropriate packet format for each spatial channel on each subband. However, sending all M·N CQI values to base station 110 may consume a significant amount of uplink resources.

In an aspect, differential encoding may be used to reduce the amount of channel state information to send. Differential encoding refers to conveying differences between values instead of actual values. If the variation in the values is small relative to the actual values, then the differences may be conveyed using fewer bits than the actual values. Differential encoding may provide good performance while reducing signaling overhead. Differential encoding may be performed on CQI values across space, across frequency, across space and frequency across space, frequency and time, or across some other combination of dimensions.

Table 1 lists different information that may be sent for CQI information. A full CQI value may also be referred to as a CQI value, a pivot CQI value, an actual CQI value, etc. A differential CQI value may convey the difference between two full CQI values (e.g., Y or $\Delta X$) or the difference between two differential CQI values (e.g., $\Delta Y$, $\Delta\Delta X$, or $\Delta\Delta Y$). In general, differential CQI information may comprise any information indicative of differences in full and/or differential CQI values, e.g., Y, $\Delta X$, $\Delta Y$, $\Delta\Delta X$, and/or $\Delta\Delta Y$ in Table 1.

TABLE 1

| Symbol | Description |
|---|---|
| X | Full CQI value (e.g., an SNR value) for a spatial channel on a subband. |
| Y | Difference in CQI values for two spatial channels on the same subband. |
| $\Delta X$ | Difference in CQI values for a given spatial channel on two subbands. |
| $\Delta Y$ | Difference in Y values for two subbands. |
| $\Delta\Delta X$ | Difference in $\Delta X$ values for two time intervals. |
| $\Delta\Delta Y$ | Difference in $\Delta Y$ values for two time intervals. |

For differential encoding across space, one spatial channel may be a designated spatial channel, and the remaining spatial channels may be non-designated spatial channels. A full CQI value may be provided for the designated spatial channel, and a differential CQI value may be provided for each non-designated spatial channel or for all non-designated spatial channels. For differential encoding across frequency, one subband may be a designated subband, and the remaining subbands may be non-designated subbands. A full CQI value may be provided for the designated subband, and a differential CQI value may be provided for each non-designated subband. For differential encoding across time, one time interval may be a designated time interval, and one or more other time intervals may be non-designated time intervals. A full CQI value may be provided for the designated time interval, and a differential CQI value may be provided for each non-designated time interval. A designated subband may also be referred to as a primary subband, a preferred subband, a reference subband, etc. A designated spatial channel and a designated time interval may also be referred to by other terms.

FIG. 3A shows a design of differential CQI encoding across space for two spatial channels on one subband. In this example, a CQI value of $X_a$ is obtained for designated spatial channel a, and a CQI value of $X_b$ is obtained for non-designated spatial channel b. Terminal 150 (or a transmitter) may derive and send the following CQI information:

$$X = X_a, \text{ and} \qquad \text{Eq (1)}$$

$$Y = X_b - X_a.$$

Base station 110 (or a receiver) may receive X and Y from terminal 150 and may derive the original CQI values, as follows:

$$X_a = X, \text{ and} \qquad \text{Eq (2)}$$

$$X_b = X + Y.$$

The CQI values derived by base station 110 may not exactly match the CQI values obtained by terminal 150 due to quantization of X and Y. For simplicity, much of the following description assumes no quantization error.

Figure 3B:
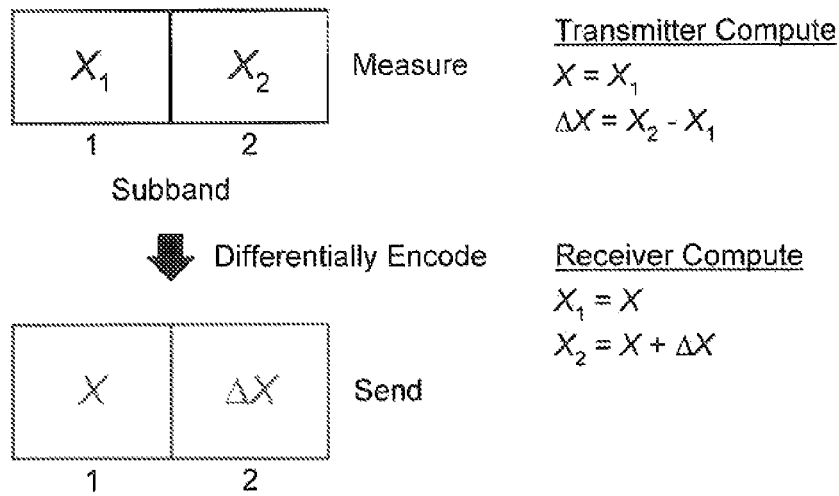
FIG. 3B shows differential CQI encoding across frequency.

FIG. 3B shows a design of differential CQI encoding across frequency for one spatial channel on two subbands. In this example, a CQI value of $X_1$ is obtained for the spatial channel on designated subband 1, and a CQI value of $X_2$ is obtained for the same spatial channel on non-designated subband 2. Terminal 150 may derive and send the following CQI information:

$$X = X_1, \text{ and} \qquad \text{Eq (3)}$$

$$\Delta X = X_2 - X_1.$$

Base station 110 may receive X and ΔX from terminal 150 and may derive the original CQI values, as follows:

$$X_1 = X, \text{ and} \qquad \text{Eq (4)}$$

$$X_2 = X + \Delta X.$$

Differential CQI encoding across frequency may be used if a single data stream is sent on a single spatial channel. In this case a differential CQI value may not be needed for another spatial channel.

Figure 3C:
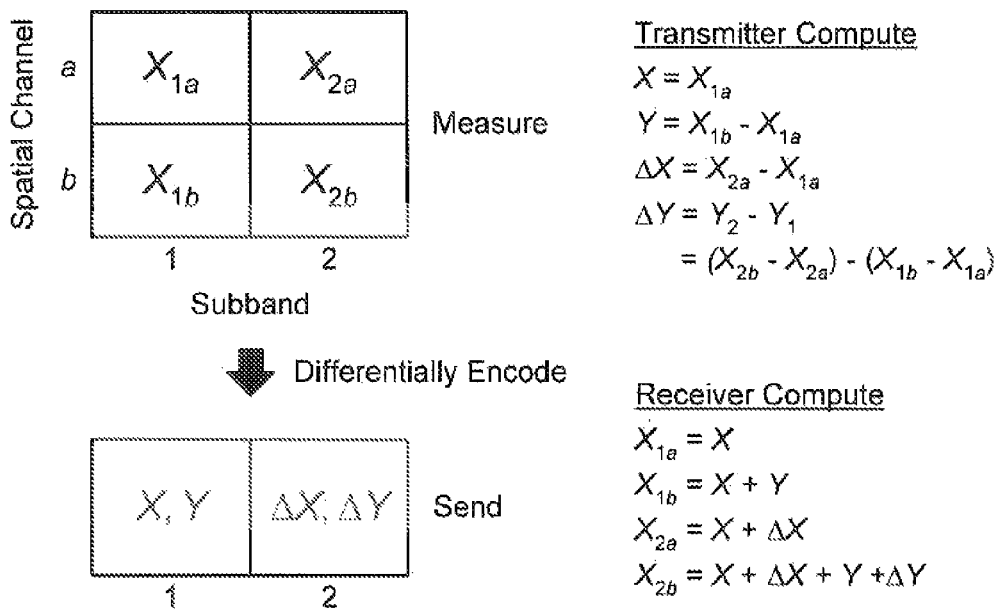
FIG. 3C shoes differential CQI encoding across space and frequency.

FIG. 3C shows a design of differential CQI encoding across space and frequency for two spatial channels on two subbands. In this example, a CQI value of $X_{1a}$ is obtained for designated spatial channel a and a CQI value of $X_{1b}$ is obtained for non-designated spatial channel b on designated subband 1. CQI values of $X_{2a}$ and $X_{2b}$ are obtained for spatial channels a and b, respectively, on non-designated subband 2. Terminal 150 may derive the following CQI information:

$$X = X_{1a}, \qquad \text{Eq (5)}$$

$$Y = X_{1b} - X_{1a},$$

$$\Delta X = X_{2a} - X_{1a}, \text{ and}$$

$$\Delta Y = Y_2 - Y_1 = \underbrace{(X_{2b} - X_{2a})}_{Y_2} - \underbrace{(X_{1b} - X_{1a})}_{Y_1},$$

where $Y_1$ and $Y_2$ are differential CQI values for spatial channel b on subbands 1 and 2, respectively. Terminal 150 may send X and Y as CQI information for subband 1 and may send ΔX and ΔY as CQI information for subband 2.

Base station 110 may receive X, Y, ΔX and ΔY from terminal 150 and may derive the original CQI values, as follows:

$$X_{1a} = X,$$

$$X_{1b} = X + Y,$$

$$X_{2a} = X + \Delta X, \text{ and}$$

$$X_{2b} = X + \Delta X + Y + \Delta Y. \qquad \text{Eq. (6)}$$

In the design shown in equation (5) differential encoding is performed across space first and then across frequency. Differential encoding may also be performed across frequency first and then across space.

Figure 3D:
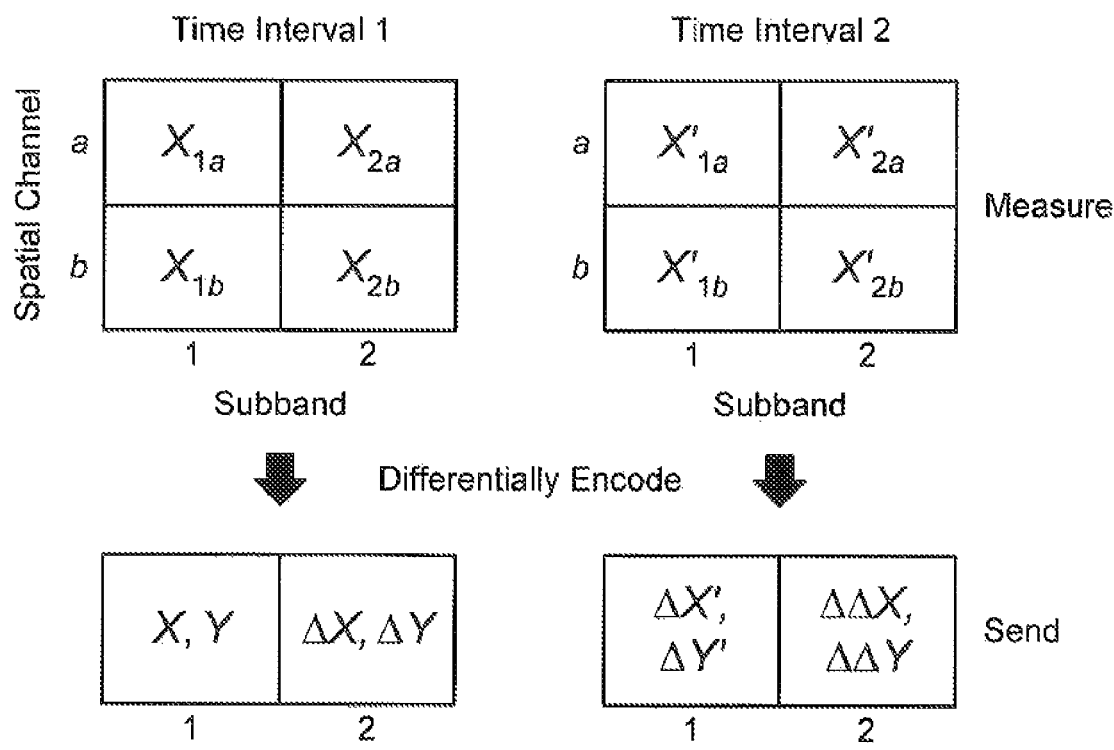
FIG. 3D shows differential CQI encoding across space, frequency and time.

FIG. 3D shows a design of differential CQI encoding across spatial, frequency, and time for two spatial channels on two subbands in two time intervals. In time interval 1, CQI values of $X_{1a}$ and $X_{1b}$ are obtained for spatial channels a and b on designated subband 1, and CQI values of $X_{2a}$ and $X_{2b}$ are obtained for spatial channels a and b on non-designated subband 2. In time interval 2, CQI values of $X'_{1a}$ and $X'_{1b}$ are obtained for spatial channels a and b on subband 1, and CQI values of $X'_{2a}$ and $X'_{2b}$ are obtained for spatial channels a and b on subband 2. Terminal 150 may derive CQI information for time interval 1 as shown in equation set (5).

Terminal 150 may derive CQI information for time interval 2, as follows:

$$\Delta X' = X'_{1a} - X_{1a}, \qquad \text{Eq (7)}$$

$$\Delta Y' = Y'_1 - Y_1 = \underbrace{(X'_{1b} - X'_{1a})}_{Y'_1} - \underbrace{(X_{1b} - X_{1a})}_{Y_1},$$

$$\Delta \Delta X = \Delta X'_2 - \Delta X = \underbrace{(X'_{2a} - X'_{1a})}_{\Delta X'_2} - \underbrace{(X_{2a} - X_{1a})}_{\Delta X}, \text{ and}$$

$$\Delta \Delta Y = \Delta Y'_2 - \Delta Y = \underbrace{(Y'_2 - Y'_1)}_{\Delta Y'_2} - \underbrace{(Y_2 - Y_1)}_{\Delta Y}$$

$$= \frac{(X'_{2b} - X'_{2a})}{Y'_2} - \frac{(X'_{1b} - X'_{1a})}{Y'_1} - \frac{(X_{2b} - X_{2a})}{Y_2} + \frac{(X_{1b} - X_{1a})}{Y_1}$$

where ΔX' is the difference in CQI values for spatial channel a on subband 1 in two time intervals, ΔY' is the difference in Y values for spatial channel b on subband 1 in two time intervals, ΔΔX is the difference in ΔX values for spatial channel a in two time intervals, and ΔΔY is the difference in ΔY values for spatial channel b in two time intervals.

For time interval 1, terminal 150 may send X and Y as CQI information for subband 1 and may send ΔX and ΔY as CQI information for subband 2. For time interval 2, terminal 150 may send ΔX' and ΔY' as CQI information for subband 1 and may send ΔΔX and ΔΔY as CQI information for subband 2.

Base station 110 may receive X, Y, ΔX and ΔY from terminal 150 in time interval 1 and may receive ΔX', ΔY', ΔΔX and ΔΔY in time interval 2. Base station 110 may derive the original CQI values for time interval 1 as shown in equation set (6). Base station 110 may derive the original CQI values for time interval 2 as follows:

$$X'_{1a} = X + \Delta X',$$

$$X'_{1b} = X'_{1a} + Y + \Delta Y',$$

$$X'_{2a} = X'_{1a} + \Delta X + \Delta \Delta X, \text{ and}$$

$$X'_{2b} = X'_{1b} + \Delta X + \Delta \Delta X + \Delta Y + \Delta \Delta Y = X'_{2a} + Y + \Delta Y' + \Delta Y + \Delta \Delta Y. \qquad \text{Eq (8)}$$

In the design shown in equation (7), differential encoding is performed across space first, then across frequency, and then across time. Differential encoding may also be performed across frequency first, then across space and then across time.

For simplicity, FIGS. 3A through 3D show differential encoding for two spatial channels, two subbands, and two time intervals. Differential encoding may be extended to any number of spatial channels, any number of subbands, and any number of time intervals.

Differential encoding across space for more than two spatial channels may be performed in various manners. In one design, the CQI values for the spatial channels are assumed to be linearly related by a common Y value, Thus, if designated spatial channel a has a CQI value of X, then spatial channel b has a CQI value of X+Y, spatial channel c has a CQI value of X+2Y, spatial channel d has a CQI value of X+3Y, etc. A single Y value may be sent for all non-designated spatial channels. In another design, a separate Y value may be computed for each non-designated spatial channel relative to the designated spatial channel or an adjacent spatial channel. For channel, if spatial channels a, b, c and d have CQI values of $X_a$, $X_b$, $X_c$ and $X_d$, respectively, then Y values for spatial channels b, c and d may be computed as $Y_b = X_b - X_a$, $Y_c = X_c -$ $X_b$, and $Y_d=X_d-X_c$, respectively. The $Y_b$, $Y_c$ and $Y_d$ values may be sent for spatial channels b, c and d, respectively. In yet another design, a separate Y value may be computed for each non-designated spatial channel. A single index may then be sent to convey the Y values for all non-designated spatial channels. Different combinations of Y values may be defined and stored in a look-up table. The single index may indicate a specific combination of Y values in the look-up table that most closely matches the set of computed Y values. The Y values for multiple non-designated spatial channels may also be conveyed in other manners. For simplicity, much of the following description assumes one non-designated spatial channel.

In general, any number of bits may be used for each piece of information included in the channel state information. The following notation is used in the description below:

$N_X$—number of bits for a full CQI value X,
$N_Y$—number of bits for a differential CQI value Y,
$N_W$—number of bits for both differential CQI values $\Delta X$ and $\Delta Y$,
$N_Z$—number of bits for spatial state information, and
$N_S$—number of bits to indicate a designated subband, which is $N_S = \lceil \log_2 N \rceil$.

The number of bits to use for a given piece of information may be selected based on a tradeoff between the amount of detail or resolution for the information versus signaling overhead. In one example design, $N_X=5$, $N_Y=3$, $N_W=4$, $N_Z=2$ for 2-layer MIMO with M=2, and $N_Z=4$ for 4-layer MIMO with M=4. Other values may also be used for $N_X$, $N_Y$, $N_W$, and $N_Z$.

Various reporting schemes may be used to send channel state information in an efficient manner. Some reporting schemes are described below.

FIG. 4A shows a first reporting scheme that uses differential CQI encoding across space and independent encoding for each of the N subbands. In this scheme, a full CQI value $X_n$, a differential CQI value $Y_n$, and spatial state information may be sent for each of the N subbands. A CQI report for all N subbands may include $N \cdot (N_Z+N_X+N_Y)$ bits. The full CQI value $X_n$ and the differential CQI value $Y_n$ for each subband n may be determined as shown in equation set (1).

A second reporting scheme uses differential CQI encoding across space and independent encoding for a subset of the N subbands. This subset may include L subbands and may be identified by an $N_L$-bit subband set index, where $L \geq 1$ and $N_L>1$. For example, if there are eight subbands and up to three consecutive subbands may be reported then $N_L$ may be equal to five. In this scheme, a full CQI value $X_n$, a differential CQI value $Y_n$, and spatial state information may be sent for each of the L subbands. A CQI report for the L subbands may include $L \cdot (N_Z+N_X+N_Y)+N_L$ bits.

CQI information may also be sent for different subsets of subbands in different time intervals. For example, the N subbands may be cycled through, and CQI information for one subband may be sent with $N_Z+N_X+N_Y$ bits in each time interval. CQI information for more than one subband may also be sent in each time interval.

A third reporting scheme uses differential CQI encoding across space, independent encoding for the N subbands, and common spatial state information for all N subbands. For each subband, a set of spatial channels (e.g., a set of antennas or a set of precoding vectors) that provides the best performance (e.g., the highest overall throughput) for that subband may be determined. The best spatial channel set from among N spatial channel sets for the N subbands may be selected and used as a common spatial channel set for all N spatial channels. Alternatively, a spatial channel set that provides the best performance averaged over all N subbands may be selected as the common spatial channel set. Full and differential CQI values may be derived based on the common spatial channel set. A CQI report for all N subbands may include $N_Z+N \cdot (N_X+N_Y)$ bits. The common spatial state information may also comprise other information instead of or in addition to the common spatial channel set. In another design, spatial state information may be reported for a particular unit (e.g., each subband), and CQI information may be averaged and reported for a larger unit (e.g., multiple spatial state reporting units). The CQI reporting unit may thus be larger than the spatial state reporting unit, e.g., in frequency.

FIG. 4B shows a fourth reporting scheme, which uses differential CQI encoding across space and frequency. In this scheme, a full CQI value $X_l$, a differential CQI value $Y_l$, and spatial state information may be provided for designated subband l and may be sent with $N_Z+(N_X+N_Y)$ bits. The designated subband may be a predetermined subband (e.g., subband 1), the subband with the best performance, etc. If the designated subband is not fixed, then $N_X$ bits may be sent to indicate which subband is the designated subband. Differential CQI values $\Delta X$ and $\Delta Y$ may be derived for each non-designated subband based on the common spatial state information (e.g., a common spatial channel set) and sent for that subband. A CQI report for all N subbands may include $N_Z+(N_X+N_Y)+(N-1) \cdot N_W+N_S$ bits.

In one design, differential CQI encoding across frequency is achieved by taking differences between adjacent subbands. In this design, differential CQI information for a non-designated subband n may include differential CQI values $\Delta X_n=X_n-X_{n-1}$ and $\Delta Y_n=Y_n-Y_{n-1}$ between subbands n and n−1 or differential CQI values $\Delta X_n=X_n-X_{n+1}$ and $\Delta Y_n=Y_n-Y_{n+1}$ between subbands n and n+1.

A CQI report may include different pieces of information in various formats. The N subband indices may be arranged in a monotonic manner so that subband 1 occupies the lowest frequency range and subband N occupies the highest frequency range in the system bandwidth, as shown in FIG. 2. If subband l is the designated subband, then the first $N_S$ bits may convey the designated subband index l, the next $N_Z$ bits may convey spatial state information for subband l, and the next $(N_X+N_Y)$ bits may convey the full CQI value $X_l$ and the differential CQI value $Y_l$ for subband l. The next $N_W$ bits may convey differential CQI information (e.g., $\Delta X_{l+1}$ and $\Delta Y_{l+1}$) between subbands l and l+1 across space and frequency. The next $N_W$ bits may convey differential CQI information between subbands l+1 and l+2, and so on, and $N_W$ bits may convey differential CQI information between subbands N−1 and N. Then, the next $N_W$ bits may convey differential CQI information between subbands l and l−1, the next $N_W$ bits may convey differential CQI information between subbands l−1 and l−2, and so on, and the last $N_W$ bits may convey differential CQI information between subbands 2 and 1.

The first three columns of Table 2 show a design of differential CQI information for differential encoding between adjacent subbands. In this design, the differential CQI information for each non-designated subband n includes $N_W=4$ bits and jointly provides (i) a differential CQI value $\Delta X_n$ between subband n and an adjacent subband for the designated spatial channel and (ii) a differential CQI value $\Delta Y_n$ for the non-designated spatial channel. The CQI value for each spatial channel on each subband may be determined as shown in equation sets (5) and (6).

TABLE 2

| Index | $\Delta X_n$ | $\Delta Y_n$ |
|---|---|---|
| Differential between adjacent subbands | | |
| 0 | 0 | −2 |
| 1 | −2 | −1 |
| 2 | −1 | −1 |
| 3 | 0 | −1 |
| 4 | +1 | −1 |
| 5 | +2 | −1 |
| 6 | −2 | 0 |
| 7 | −1 | 0 |
| 8 | 0 | 0 |
| 9 | +1 | 0 |
| 10 | +2 | 0 |
| 11 | −2 | +1 |
| 12 | −1 | +1 |
| 13 | 0 | +1 |
| 14 | +1 | +1 |
| 15 | +2 | +1 |
| Differential from designated subband l | | |
| 0 | −3 | −2 |
| 1 | −2 | −2 |
| 2 | −1 | −2 |
| 3 | 0 | −2 |
| 4 | +1 | −2 |
| 5 | −3 | −1 |
| 6 | −2 | −1 |
| 7 | −1 | −1 |
| 8 | 0 | −1 |
| 9 | −3 | 0 |
| 10 | −2 | 0 |
| 11 | −1 | 0 |
| 12 | 0 | 0 |
| 13 | −3 | +1 |
| 14 | −2 | +1 |
| 15 | −1 | +1 |

In another design, differential CQI encoding across frequency is achieved by taking differences with respect to the designated subband. In this design, differential CQI information for a non-designated subband n may include differential CQI values $\Delta X_n = X_n - X_l$ and $\Delta Y_n = Y_n - Y_l$ between designated subband l and non-designated subband n.

If subband l is the designated subband, then the first $N_S$ bits may convey the designated subband index l, the next $N_Z$ bits may convey spatial state information for subband l, and the next $(N_X + N_Y)$ bits may convey the full CQI value $X_l$ and the differential CQI value $Y_l$ for subband l. The next $N_W$ bits may convey differential CQI information (e.g., $\Delta X_{l+1}$ and $\Delta Y_{l+1}$) between subbands l and l+1 across space and frequency. The next $N_W$ bits may convey differential CQI information between subbands l and l+2, and so on, and $N_W$ bits may convey differential CQI information between subbands l and N. Then, the next $N_W$ bits may convey differential CQI information between subbands l and l−1, the next $N_W$ bits may convey differential CQI information between subbands l and l−2, and so on, and the last $N_W$ bits may convey differential CQI information between subbands l and 1.

The last three columns of Table 2 show a design of differential CQI information for differential encoding with respect to the designated subband. In this design, the differential CQI information for each non-designated subband n includes $N_W = 4$ bits and jointly provides (i) a differential CQI value $\Delta X_n$ between subbands l and n for the designated spatial channel and (ii) a differential CQI value $\Delta Y_n$ for the non-designated spatial channel. If the designated subband has the best performance and is used as a reference for the non-designated subbands, then the differential CQI value $\Delta X_n$ for each non-designated subband should be a non-positive value. The CQI value for each spatial channel on each subband may be determined as shown in equation sets (5) and (6).

Table 3 shows another design of the differential CQI information for differential encoding with respect to the designated subband for $N_W = 3$ bits.

TABLE 3

| Index | $\Delta X_n$ | $\Delta Y_n$ |
|---|---|---|
| 0 | −2 | −1 |
| 1 | −1 | −1 |
| 2 | 0 | −1 |
| 3 | −2 | 0 |
| 4 | −1 | 0 |
| 5 | 0 | 0 |
| 6 | −2 | +1 |
| 7 | −1 | +1 |

Tables 1 to 3 show some examples of joint encoding for differential CQI values $\Delta X_n$ and $\Delta Y_n$. Other joint encoding designs may also be used.

A CQI report may convey CQI information for all N subbands, e.g., as shown in FIG. 4B. A CQI report may also convey CQI information for a subset of the N subbands. In one design, a CQI report for an even time interval may include a full CQI value $X_l$, a differential CQI value $Y_l$, and spatial state information for the designated subband l and may be sent with $N_S + N_Z + (N_X + N_Y)$ bits. A CQI report for an odd time interval may include differential CQI values $\Delta X$ and $\Delta Y$ for each non-designated subband and may be sent with $(N-1) \cdot N_W$ bits. If there are many subbands, then the CQI information for the non-designated subbands may be sent in multiple time intervals. The CQI information for the designated and non-designated subbands may also be sent in other manners.

Figure 4C:
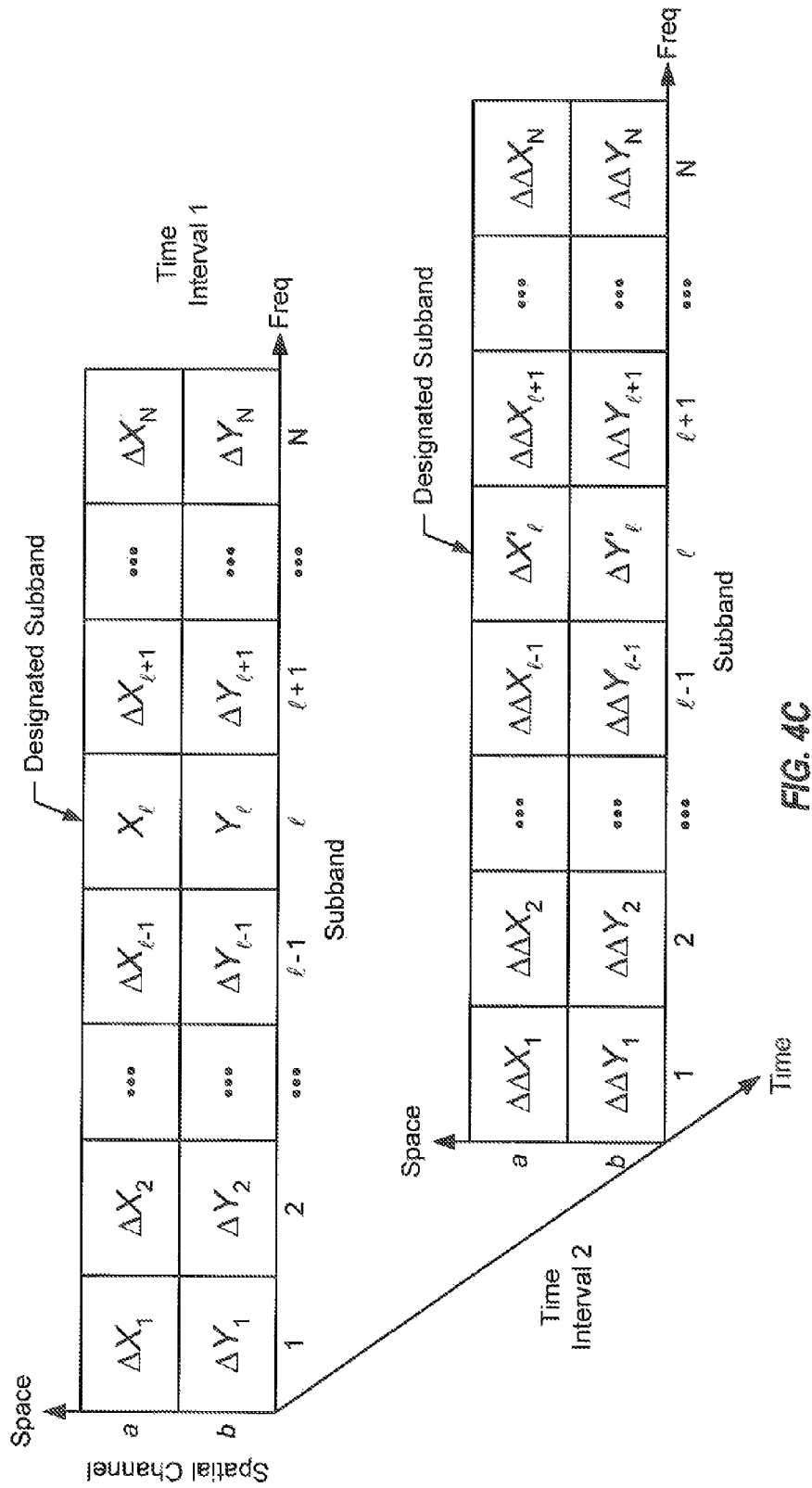
FIG. 4C shows differential CQI encoding across space, frequency and time.

FIG. 4C shows a fifth reporting scheme, which uses differential CQI encoding across space, frequency and time. Differential encoding may be performed across time (e.g., (e.g., across consecutive reporting intervals) if the wireless channel varies slowly. In this scheme, a CQI report containing space-frequency CQI information may be sent every P time intervals, where P>1. The space-frequency CQI information may comprise CQI information generated for one or more spatial channels on one or more subbands based on any of the schemes described above. For example, the space-frequency CQI information may comprise $N_Z + (N_X + N_Y) + (N-1) \cdot N_W + N_S$ bits for CQI information generated for two spatial channels on N subbands based on the fourth scheme described above. The space-frequency CQI information may be sent in one time interval or possibly multiple time intervals, as discussed above. One or more CQI reports containing temporal differential CQI information may be sent in time intervals between those with space-frequency CQI information. The temporal differential CQI information in each CQI report may be generated with respect to CQI information for a previous CQI report. The temporal differential CQI information may comprise $\Delta X$ and $\Delta Y$ for the designated subband and $\Delta\Delta X$ and $\Delta\Delta Y$ for each non-designated subband being reported. The $\Delta X$, $\Delta Y$, $\Delta\Delta X$ and $\Delta\Delta Y$ values may be derived as described above for FIG. 3D. A change in the designated subband may be made every P time intervals.

The first through fifth reporting schemes described above assume that multiple spatial channels are available. If a single spatial channel is used, then differential encoding may be performed across frequency, and differential CQI value Y may be omitted. $\Delta X$ values may be sent with fewer bits since only difference across frequency (and not across space) is conveyed. Differential encoding may also be performed across frequency and time. The ΔX and ΔΔX values may be sent with fewer bits if differential encoding across space is not performed.

In general, the CQI information and the spatial state information may be reported at the same rate or different rates. The spatial state information may be reported at one rate, and the CQI information may be reported at a second rate, which may be slower or faster than the first rate.

Channel state information may be generated and reported based on a configuration, which may be selected for terminal 150 and may be changed in a semi-static manner via signaling. In one design, channel state information may be obtained for the designated subband and reported. In another design, channel state information may be averaged over all subbands (e.g., based on a channel capacity function), and the average channel state information may be reported. If the average channel state information is reported, then differential CQI information may be obtained with respect to the average CQI information. Furthermore, there is no need to convey the designated subband.

The spatial state information may be dependent on preference of terminal 150. In one design, the criterion used to select a set of spatial channels (or a set of antennas) may be based on the average channel characteristics of all subbands. In another design, the criterion may be based on the channel characteristics of the designated subband.

In one design, terminal 150 may generate channel state information based on a selected reporting scheme and report channel state information on a continual basis in each reporting interval. This design may be used, e.g., when terminal 150 has a service duration covering one or few report intervals.

In another design, terminal 150 may generate and/or report channel state information in different manners during the service duration. This design may be used, e.g., when the service duration is much longer than the reporting interval. Terminal 150 may transmit multiple packets during the service duration and may select a suitable packet format and a suitable set of spatial channels for each packet transmission. A packet transmission may span one or multiple reporting intervals. A designated subband may be selected for each packet transmission and may change from packet transmission to packet transmission. The subband selection may persist for each packet transmission. In this case, the index of the designated subband may be omitted in CQI reports sent during the packet transmission.

Terminal 150 may operate in one of several operating modes, such as a scheduled mode and an unscheduled mode, at any given moment. In the scheduled mode, terminal 150 may be scheduled for transmission on the downlink and may have a persistent subband allocation that is known by both the terminal and the base station. In the scheduled mode, it may be desirable to accurately report average channel state information for the allocated subband(s) rather than inaccurately report channel state information for all of the subbands. In the unscheduled mode, terminal 150 may not be scheduled for transmission on the downlink and may not have a persistent subband allocation. In the unscheduled mode, it may be desirable to report channel state information for as many subbands as possible. Terminal 150 may transition between the scheduled and unscheduled modes depending on whether the terminal is scheduled for transmission. For example, terminal 150 may operate in the scheduled mode during its service duration and may operate in the unscheduled mode outside of its service duration.

In another aspect, a heterogeneous reporting scheme is used, and terminal 150 may send different channel state information depending on its operating mode. In the scheduled mode, terminal 150 may generate a full CQI value X and a differential CQI value Y on the basis of the overall or average channel characteristics of the allocated subband(s). Terminal 150 may convey the full CQI value, the differential CQI value, and spatial state information in $N_Z+(N_X+N_Y)$ bits. Terminal 150 may report channel state information at higher rate or more frequently in order to update the channel state information in a timely manner. For example, terminal 150 may report $N_Z+(N_X+N_Y)$ bits in each reporting interval.

In the unscheduled mode, terminal 150 may generate CQI information for all or many of the subbands. For example, terminal 150 may generate CQI information based on the fourth reporting scheme in FIG. 4B and may send $N_Z+(N_X+N_Y)+(N-1)\cdot N_W+N_S$ bits for all N subbands. Terminal 150 may also generate CQI information based on the fifth reporting scheme in FIG. 4C or some other scheme. Terminal 150 may report channel state information at lower rate or less frequently in order to reduce signaling overhead.

Figure 5:
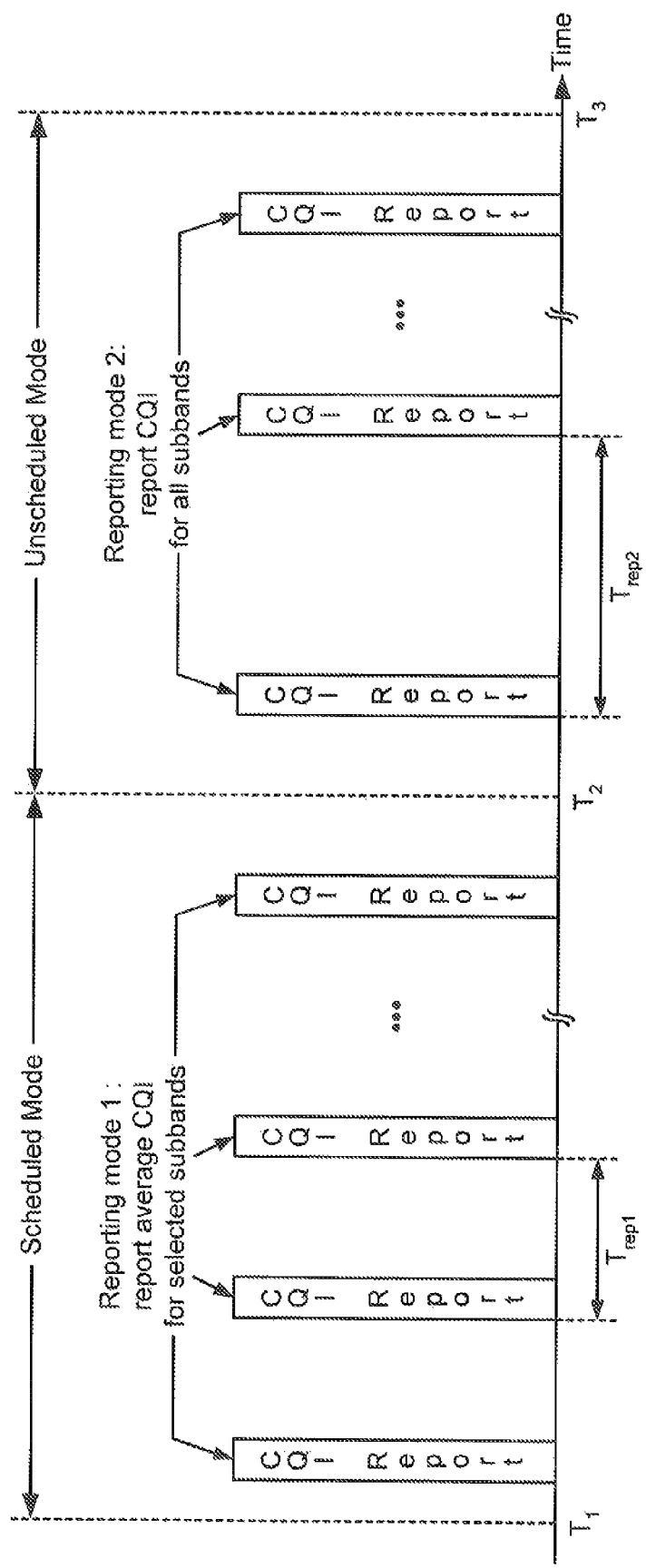
FIG. 5 illustrates heterogeneous CQI reporting.

FIG. 5 illustrates the heterogeneous reporting scheme. Terminal 150 may operate in the scheduled mode between times $T_1$ and $T_2$. During this time period, terminal 150 may determine channel state information (e.g., average CQI) for only the selected subband(s) and may report channel state information more frequently, e.g., at a rate of once every $T_{rep1}$ seconds. Terminal 150 may operate in the unscheduled mode between times $T_2$ and $T_3$. During this time period, terminal 150 may determine channel state information for all N subbands (e.g., CQI for each subband) and may report channel state information less frequently, e.g., at a rate of once every $T_{rep2}$ seconds, where $T_{rep2}>T_{rep1}$.

Figures 6, 7:
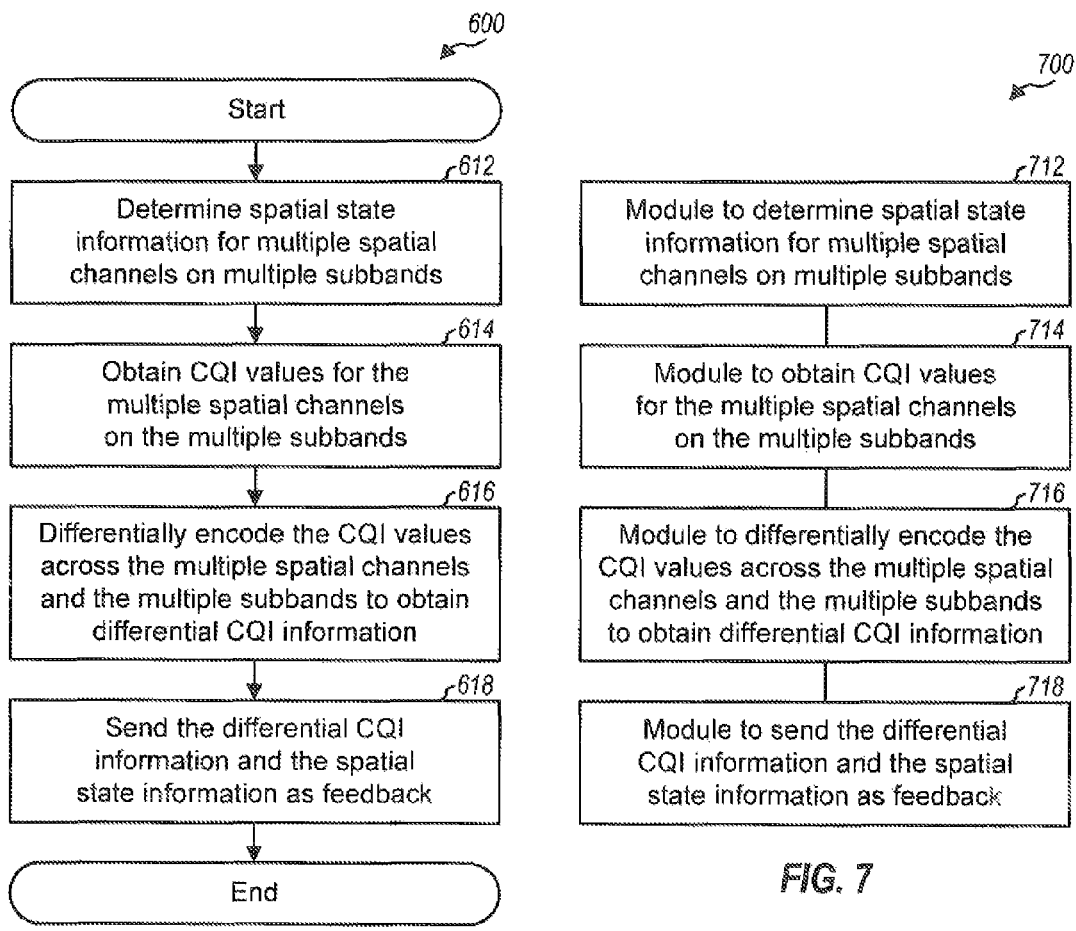
FIGS. 6 and 7 show a process and an apparatus, respectively, for reporting channel state information with differential encoding across space and frequency.

FIG. 6 shows a design of a process 600 for reporting channel state information with differential encoding across space and frequency. Spatial state information may be determined for multiple spatial channels on multiple subbands (block 612). The multiple spatial channels may correspond to multiple antennas selected from among a plurality of antennas available for transmission. The spatial state information may then convey the selected antennas. The multiple spatial channels may also correspond to multiple precoding vectors selected from among a plurality of precoding vectors available for transmission. The spatial state information may then convey the selected precoding vectors. The spatial state information may convey multiple spatial channels for each subband, for each set of subbands, or for all subbands.

CQI values may be obtained for the multiple spatial channels on the multiple subbands (block 614). The CQI values may correspond to SNR estimates or some other measure of received signal quality. The CQI values may be differentially encoded across the multiple spatial channels and the multiple subbands to obtain differential CQI information (block 616). The differential CQI information may comprise any of the information shown in Table 1 (e.g., Y, ΔX, ΔY, ΔΔX, and ΔΔY) and/or some other information. The differential CQI information and the spatial state information may be sent as feedback (block 618).

For block 614, the CQI values may be differentially encoded across the multiple spatial channels and the multiple subbands with respect to a reference CQI value. This reference CQI value may be a CQI value for a designated spatial channel on a designated subband an average CQI value for all spatial channels on the designated subband, an average CQI value for all spatial channels and all subbands, etc. The reference CQI value may be sent with the differential CQI information.

The differential encoding in block 614 may be performed in various manners. The CQI values may be differentially encoded across the multiple spatial channels first and then across the multiple subbands. Alternatively, the CQI values may be differentially encoded across the multiple subbands first and then across the multiple spatial channels.

The multiple spatial channels may comprise a designated spatial channel and at least one non-designated spatial channel. The multiple subbands may comprise a designated subband and at least one non-designated subband. At least one differential CQI value (e.g., $Y_n$) may be determined for the at least one non-designated spatial channel on each subband based on CQI values for the spatial channels on that subband. For each non-designated subband, the difference (e.g., $\Delta X_n$) between a CQI value for the designated spatial channel on that non-designated subband and a CQI value of the designated spatial channel on either the designated subband or an adjacent subband may be determined. For each non-designated subband, the different (e.g., $\Delta Y_n$) between at least one differential CQI value (e.g., $Y_n$) for the at least one non-designated spatial channel on that non-designated subband and at least one differential CQI value (e.g., $Y_l$, $Y_{n-1}$, or $Y_{n+1}$) for the at least one none-designated spatial channel on either the designated subband or an adjacent subband may also be determined. For each non-designated subband, the differential CQI value (e.g., $\Delta X_n$) for the designated spatial channel and the at least one differential CQI value (e.g., $\Delta Y_n$) for the at least one non-designated spatial channel may be mapped to an index, which may be sent as the differential CQI information for that non-designated subband.

FIG. 7 shows a design of an apparatus 700 for reporting channel state information with differential encoding across space and frequency. Apparatus 700 includes means for determining spatial state information for multiple spatial channels on multiple subbands (module 712), means for obtaining CQI values for the multiple spatial channels on the multiple subbands (module 714), means for differentially encoding the CQI values across the multiple spatial channels and the multiple subbands to obtain differential CQI information (module 716), and means for sending the differential CQI information and the spatial state information as feedback (module 718). Modules 712 to 718 may comprise processors, electronics devices, hardware devices, electronics components, logical circuits, memories, etc., or any combination thereof.

Figures 8, 9:
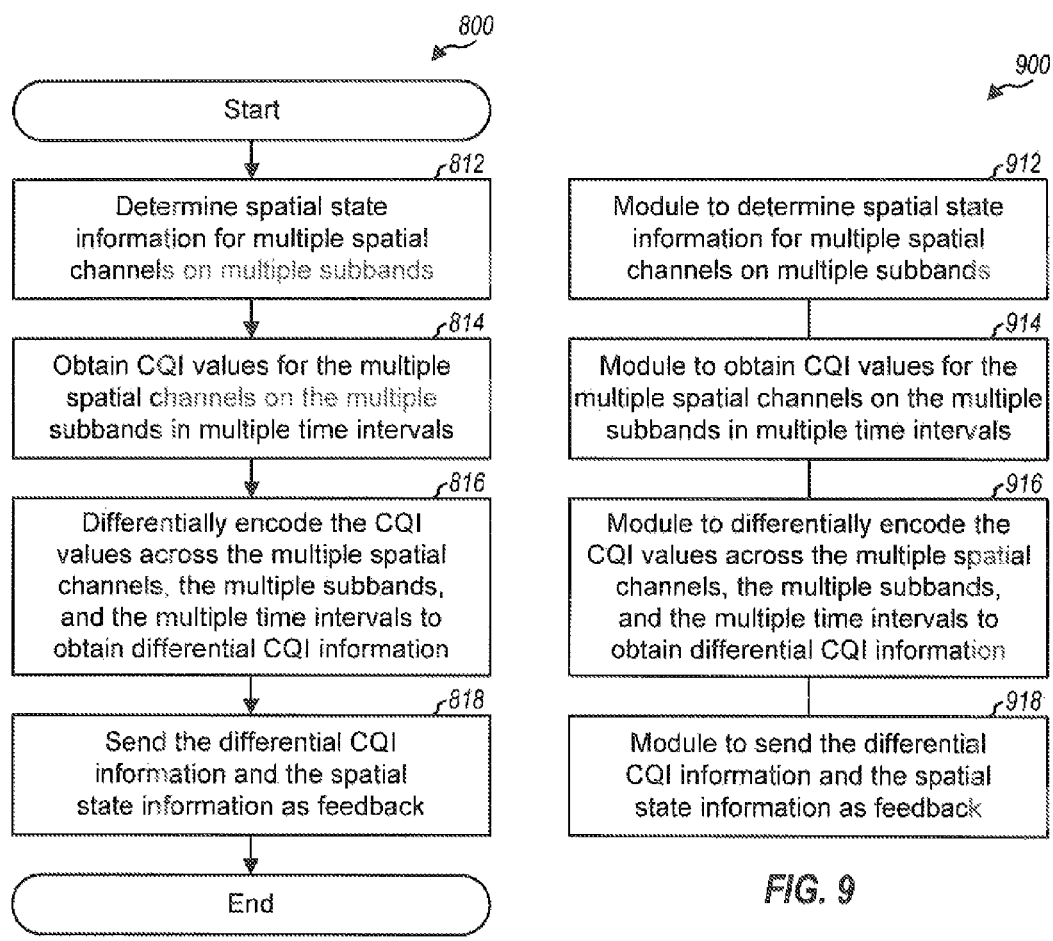
FIGS 8 and 9 show a process and an apparatus, respectively, for reporting channel state information with differential encoding across space, frequency and time.

FIG. 8 shows a design of a process 800 for reporting channel state information with differential encoding across space, frequency and time. Spatial state information may be determined for multiple spatial channels on multiple subbands (block 812). CQI values may be obtained for the multiple spatial channels on the multiple subbands in multiple time intervals (block 814). The CQI values may be differentially encoded across the multiple spatial channels, the multiple subbands, and the multiple time intervals to obtain differential CQI information (block 816). The differential CQI information and the spatial state information may be sent as feedback (block 818).

For block 816, the CQI values may be differentially encoded across the multiple spatial channels and the multiple subbands in each time interval to obtain differential CQI values (e.g., Y, $\Delta X$ and $\Delta Y$) for that time interval. The CQI values may be differentially encoded across the multiple spatial channels first and then across the multiple subbands. The multiple time intervals may comprise a designated time interval and at least one non-designated time interval. For each non-designated time internal, differences (e.g., $\Delta \Delta X$ and $\Delta \Delta Y$) between the differential CQI values for that non-designated time interval and the differential CQI values for a preceding time interval may be determined.

For block 818, the differential CQI values (e.g. Y, $\Delta X$, $\Delta Y$, etc.) for the designated time interval may be sent as differential CQI information for the designated time interval. The differences in differential CQI values (e.g., $\Delta \Delta X$, $\Delta \Delta Y$, etc.) determined for each non-designated time interval may be sent as differential CQI information for that non-designated time interval.

FIG. 9 shows a design of an apparatus 900 for reporting channel state information with differential encoding across space, frequency and time. Apparatus 900 includes means for determining spatial state information for multiple spatial channels on multiple subbands (module 912), means for obtaining CQI values for the multiple spatial channels on the multiple subbands in multiple time intervals (module 914), means for differentially encoding the CQI values across the multiple spatial channels, the multiple subbands, and the multiple time intervals to obtain differential CQI information (module 916), and means for sending the differential CQI information and the spatial state information as feedback (module 918). Modules 912 to 918 may comprise processors, electronics devices, hardware devices, electronics components, logical circuits, memories, etc., or any combination thereof.

FIG. 10 shows a design of a process 1000 for heterogeneous reporting of channel state information. CQI information may be reported in accordance with a first reporting mode while in a first operating mode, e.g., a scheduled mode (block 1012). CQI information may be reported in accordance with a second reporting mode while in a second operating mode, e.g., a unscheduled mode (block 1014). The CQI information may be sent at a first rate in the first reporting mode and may be sent at a second rate in the second reporting mode. The second rate may be slower than the first rate.

For the first reporting mode, CQI values may be obtained for multiple spatial channels on at least one subband selected from among multiple subbands available for transmission. The CQI values may be differentially encoded across the multiple spatial channels and the at least one selected subband to obtain the CQI information for the first reporting mode. The CQI values may be averaged across the selected subband(s), and the average CQI values for the multiple spatial channels may be differentially encoded.

For the second reporting mode, CQI values may be obtained for multiple spatial channels on multiple subbands available for transmission. The CQI values may be differentially encoded across the multiple spatial channels and the multiple subbands to obtain the CQI information for the second reporting mode.

FIG. 11 shows a design of an apparatus 1100 for heterogeneous reporting of channel state information. Apparatus 1100 includes means for reporting CQI information in accordance with a first reporting mode while in a first operating mode, e.g., a scheduled mode (module 1112), and means for reporting CQI information in accordance with a second reporting mode while in a second operating mode, e.g., a unscheduled mode (module 1114). Modules 1112 and 1114 may comprise processors, electronics devices, hardware devices, electronics components, logical circuits, memories, etc., or any combination thereof.

An OFDMA system may be able to achieve substantial gain through subband scheduling. However, the number of subbands in the system may not be small. Space-frequency differential CQI encoding (e.g., the fourth reporting scheme in FIG. 4B) or space-frequency-time differential CQI encoding (e.g., the fifth reporting scheme in FIG. 4C) may be able to reduce feedback overhead in MIMO-OFDMA operation. The data streams may be sent with spatial diversity, e.g., using antenna permutation, precoding, etc. The spatial diversity may result in smaller SNR variations between adjacent subbands than for a single-input single-output (SISO) transmission. The smaller SNR variation may make two-dimensional differential encoding across space and frequency more effective.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 192 in FIG. 1) and executed by a processor (e.g., processor 190). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
 a processor configured to obtain channel quality indicator (CQI) values for multiple spatial channels on multiple subbands, to differentially encode the CQI values across the multiple spatial channels with respect to a reference CQI value to obtain differential CQI information, and to send the differential CQI information as feedback, wherein the reference CQI value comprises a CQI value for a designated spatial channel; and
 a memory coupled to the processor.

2. The apparatus of claim 1, wherein the processor is configured to differentially encode the CQI values across the multiple spatial channels first and to differentially encode the CQI values across the multiple subbands next.

3. The apparatus of claim 1, wherein the processor is configured to differentially encode the CQI values across the multiple subbands first and to differentially encode the CQI values across the multiple spatial channels next.

4. A method comprising:
 obtaining channel quality indicator (CQI) values for multiple spatial channels on multiple subbands;
 differentially encoding the CQI values across the multiple spatial channels with respect to a reference CQI vale to obtain differential CQI information, wherein the referenced CQI value comprises a CQI value for a designated spatial channel; and
 sending the differential CQI information as feedback.

5. The method of claim 4, wherein the differentially encoding the CQI values comprises:
 differentially encoding the CQI values across the multiple spatial channels first, and
 differentially encoding the CQI values across the multiple subbands next.

6. An apparatus comprising:
 means for obtaining channel quality indicator (CQI) values for multiple spatial channels on multiple subbands;
 means for differentially encoding the CQI values across the multiple spatial channels and the multiple subbands with respect to a reference CQI vale to obtain differential CQI information, wherein the referenced CQI value comprises a CQI value for a designated spatial channel; and
 means for sending the differential CQI information as feedback.

7. The apparatus of claim 6, wherein the multiple spatial channels comprise a designated spatial channel and at least one non-designated spatial channel, wherein the multiple subbands comprise a designated subband and at least one non-designated subband, and wherein the means for differentially encoding the CQI values comprises, for each non-designated subband,
 means for obtaining a differential CQI value for the designated spatial channel,
 means for obtaining at least one differential CQI value for the at least one non-designated spatial channel, and
 means for mapping the differential CQI value for the designated spatial channel and the at least one differential CQI value for the at least one non-designated spatial channel to an index.

8. A non-transitory processor-readable medium including instructions stored thereon, comprising:
 a first instruction set for obtaining channel quality indicator (CQI) values for multiple spatial channels on multiple subbands;
 a second instruction set for differentially encoding the CQI values across the multiple spatial channels with respect to a reference CQI value to obtain differential CQI information, wherein the referenced CQI value comprises one of a CQI value for a designated spatial channel; and
 a third instruction set for sending the differential CQI information as feedback.

9. The non-transitory processor-readable medium of claim 8, wherein the second instruction set comprises
 a fourth instruction set for differentially encoding the CQI values across the multiple spatial channels first, and
 a fifth instruction set for differentially encoding the CQI values across the multiple subbands next.

10. The non-transitory processor-readable medium of claim 8, wherein the multiple spatial channels comprise a designated spatial channel and at least one non-designated spatial channel, wherein the multiple subbands comprise a designated subband and at least one non-designated subband, and wherein the second instruction set comprises
 a fourth instruction set for obtaining a differential CQI value for the designated spatial channel on each non-designated subband,
 a fifth instruction set for obtaining at least one differential CQI value for the at least one non-designated spatial channel on each non-designated subband, and
 a sixth instruction set for mapping the differential CQI value for the designated spatial channel and the at least one differential CQI value for the at least one non-designated spatial channel on each non-designated subband to an index.

11. An apparatus comprising:
   a processor configured to obtain channel quality indicator (CQI) values for multiple spatial channels, to differentially encode the CQI values across the multiple spatial channels with respect to a CQI value for a designated spatial channel to obtain differential CQI information, and to send the differential CQI information as feedback; and
   a memory coupled to the processor.

12. The apparatus of claim 11, wherein the processor is configured to obtain the CQI values for the multiple spatial channels on a subband selected from among a plurality of subbands available for transmission.

13. The apparatus of claim 11, wherein the processor is configured to obtain the CQI values for the multiple spatial channels by averaging over multiple subbands available for transmission.

14. The apparatus of claim 11, wherein the processor is configured to obtain CQI values for the multiple spatial channels in multiple time intervals, and to differentially encode the CQI values across the multiple spatial channels and the multiple time intervals to obtain differential CQI information for each time interval.

15. An apparatus comprising:
   a processor configured to obtain channel quality indicator (CQI) values for multiple spatial channels on multiple subbands in multiple time intervals, to differentially encode the CQI values across the multiple spatial channels, the multiple subbands, and the multiple time intervals to obtain differential CQI information, and to send the differential CQI information as feedback, wherein the processor is configured to differentially encode the CQI values across the multiple spatial channels with respect to a reference CQI value in each time interval to obtain differential CQI values for the time interval, wherein the reference CQI value comprises a CQI value for a designated spatial channel; and
   a memory coupled to the processor.

16. The apparatus of claim 15, wherein in each time interval the processor is configured to differentially encode the CQI values across the multiple spatial channels first and to differentially encode the CQI values across the multiple subbands next.

17. The apparatus of claim 15, wherein the multiple time intervals comprise a designated time interval and at least one non-designated time interval, and wherein for each non-designated time interval the processor is configured to determine differences between the differential CQI values for the non-designated time interval and the differential CQI values for a preceding time interval.

18. The apparatus of claim 17, wherein the processor is configured to send the differential CQI values for the designated time interval as differential CQI information for the designated time interval, and to send the differences in differential CQI values for each non-designated time interval as differential CQI information for the non-designated time interval.

19. A method comprising:
   obtaining channel quality indicator (CQI) values for multiple spatial channels on multiple subbands in multiple time intervals;
   differentially encoding the CQI values across the multiple spatial channels, the multiple subbands, and the multiple time intervals to obtain differential CQI information; and
   sending the differential CQI information as feedback,
   wherein the differentially encoding the CQI values comprises
   differentially encoding the CQI values across at least one of the multiple spatial channels and the multiple subbands with respect to a reference CQI in each time interval to obtain differential CQI values for the time interval, wherein the reference CQI value comprises a CQI value for a designated spatial channel or an average CQI value for the multiple subbands, and
   determining differences between differential CQI values for a non-designated time interval and differential CQI values for a preceding time interval.

20. The method of claim 19, wherein the sending the differential CQI information comprises
   sending the differential CQI values for the designated time interval as differential CQI information for the designated time interval, and
   sending the differences in differential CQI values for each non-designated time interval as differential CQI information for the non-designated time interval.

21. An apparatus comprising:
   a processor configured to report channel quality indicator (CQI) information in accordance with a first reporting mode while in a first operating mode, and to report CQI information in accordance with a second reporting mode while in a second operating mode and to differentially encode the CQI values across multiple spatial channels on at least one selected subband with respect to a CQI value of a designated spatial channel to obtain the CQI information for the first reporting mode; and
   a memory coupled to the processor.

22. The apparatus of claim 21, wherein for the first reporting mode the processor is configured to obtain CQI values for the multiple spatial channels on the at least one subband selected from among multiple subbands available for transmission.

23. The apparatus of claim 21, wherein for the second reporting mode the processor is configured to obtain CQI values for multiple spatial channels on multiple subbands available for transmission, and to differentially encode the CQI values across the multiple spatial channels and the multiple subbands to obtain the CQI information for the second reporting mode.

24. The apparatus of claim 21, wherein the processor is configured to send the CQI information at a first rate in the first reporting mode and to send the CQI information at a second rate slower than the first rate in the second reporting mode.

25. The apparatus of claim 21, wherein the processor is configured to transition to the first operating mode when scheduled for transmission and to transition to the second operating mode when not scheduled for transmission.

26. A method comprising:
   reporting channel quality indicator (CQI) information in accordance with a first reporting mode while in a first operating mode and differentially encoding the CQI values across multiple spatial channels on at least one selected subband with respect to a CQI value of a designated spatial channel to obtain the CQI information for the first reporting mode; and
   reporting CQI information in accordance with a second reporting mode while in a second operating mode.

27. The method of claim 26, wherein the reporting CQI information in accordance with the first reporting mode comprises
obtaining CQI values for the multiple spatial channels on the at least one subband selected from among multiple subbands available for transmission.

28. The method of claim 26, wherein the reporting CQI information in accordance with the second reporting mode comprises
obtaining CQI values for multiple spatial channels on multiple subbands available for transmission, and
differentially encoding the CQI values across the multiple spatial channels and the multiple subbands to obtain the CQI information for the second reporting mode.

* * * * *